United States Patent
Du et al.

(10) Patent No.: US 9,947,315 B2
(45) Date of Patent: Apr. 17, 2018

(54) METHOD AND SYSTEM FOR USING COMBINED VOICE AND CUSTOMIZED INSTRUCTIONS TO TRIGGER VEHICLE REPORTS

(71) Applicant: HONEYWELL INTERNATIONAL INC., Morris Plains, NJ (US)

(72) Inventors: Homey Du, Beijing (CN); Bin Zhang, Beijing (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/880,932

(22) Filed: Oct. 12, 2015

(65) Prior Publication Data

US 2017/0103751 A1    Apr. 13, 2017

(51) Int. Cl.
| | |
|---|---|
| *G10L 15/00* | (2013.01) |
| *G10L 15/04* | (2013.01) |
| *G10L 21/00* | (2013.01) |
| *G10L 25/00* | (2013.01) |
| *G10L 15/26* | (2006.01) |
| *G08B 21/00* | (2006.01) |
| *G08B 1/08* | (2006.01) |
| *G01M 17/00* | (2006.01) |
| *G06F 7/00* | (2006.01) |
| *G06F 19/00* | (2011.01) |
| *G06F 11/30* | (2006.01) |
| *G07C 5/00* | (2006.01) |
| *G10L 15/08* | (2006.01) |
| *G06F 17/30* | (2006.01) |

(Continued)

(52) U.S. Cl.
CPC ........ *G10L 15/08* (2013.01); *G06F 17/30749* (2013.01); *G06F 17/30761* (2013.01); *G07C 5/008* (2013.01); *G07C 5/02* (2013.01); *G07C 5/0816* (2013.01); *G08G 5/0013* (2013.01); *G10L 2015/088* (2013.01)

(58) Field of Classification Search
CPC ...... G07C 5/085; G07C 5/008; G08G 5/0013; G01C 23/00; G10L 17/005; G10L 15/265; H04L 29/08108; B64D 45/0015; G06Q 10/08; B64F 2700/6234; B06V 3/08
See application file for complete search history.

(56) References Cited

U.S. PATENT DOCUMENTS

| | | | |
|---|---|---|---|
| 6,735,505 B2 * | 5/2004 | Levine | B64D 45/00 244/158.1 |
| 7,436,322 B2 * | 10/2008 | Crank | B64D 45/0015 340/945 |

(Continued)

FOREIGN PATENT DOCUMENTS

| | | |
|---|---|---|
| EP | 2337024 A1 | 6/2011 |
| EP | 2902991 A1 | 8/2015 |

OTHER PUBLICATIONS

Extended EP Search Report for Application No. 16192959.1-1953 dated Mar. 3, 2017.

*Primary Examiner* — Anne L Thomas-Homescu
(74) *Attorney, Agent, or Firm* — Lorenz & Kopf, LLP

(57) ABSTRACT

A method and system for an onboard reporting system capable of detecting keywords in voice data and considering the keywords in combination with respective predefined instructions is provided. The provided system uses, for each keyword, predefined instructions to validate the keyword prior to sending a report.

18 Claims, 2 Drawing Sheets

(51) Int. Cl.
*G07C 5/02* (2006.01)
*G08G 5/00* (2006.01)
*G07C 5/08* (2006.01)

(56) References Cited

U.S. PATENT DOCUMENTS

| | | |
|---|---|---|
| 8,515,763 B2 | 8/2013 | Dong et al. |
| 8,666,748 B2 | 3/2014 | Dong et al. |
| 2002/0107694 A1* | 8/2002 | Lerg ................ B60C 23/06 704/273 |
| 2003/0135311 A1 | 7/2003 | Levine |
| 2003/0225492 A1* | 12/2003 | Cope ................ G07C 5/008 701/33.4 |
| 2004/0200930 A1* | 10/2004 | Bays-Muchmore .... B64C 25/00 244/109 |
| 2006/0186267 A1* | 8/2006 | Steiner .............. B64C 25/48 244/110 A |
| 2008/0045198 A1* | 2/2008 | Bhogal .............. G08G 5/0013 455/414.4 |
| 2010/0308992 A1* | 12/2010 | Al-Rehaili .......... B63C 9/0005 340/539.13 |
| 2011/0125503 A1* | 5/2011 | Dong ................ G10L 15/22 704/275 |
| 2012/0169487 A1* | 7/2012 | Poder ............... B60R 25/102 340/426.15 |
| 2013/0103297 A1* | 4/2013 | Bilek ................ G08G 5/065 701/120 |
| 2013/0158991 A1* | 6/2013 | Dong ................ G08G 5/0013 704/235 |
| 2015/0327307 A1* | 11/2015 | Randrianasolo ...... H04W 12/04 370/329 |
| 2016/0086396 A1* | 3/2016 | Nutaro .............. B64C 25/405 701/29.4 |
| 2016/0245666 A1* | 8/2016 | McQuillan .......... G01C 23/005 |

* cited by examiner

METHOD AND SYSTEM FOR USING COMBINED VOICE AND CUSTOMIZED INSTRUCTIONS TO TRIGGER VEHICLE REPORTS

TECHNICAL FIELD

Embodiments of the subject matter described herein relate generally to vehicle report systems and, more particularly, to an aircraft report system that uses combined voice and customized instructions to trigger the sending of a report.

BACKGROUND

Increasingly, aircraft reports are used in incident analysis. Traditionally, incident analyses relied upon data from aircraft equipment, such as a Flight Data Recorder (FDR) and a Cockpit Voice Recorder (CVR). The FDR generally records avionics data from various onboard sensors and aircraft subsystems, and the CVR generally records the cockpit voices during the flight. In the event of an incident, data from the FDR and CVR is often analyzed in an incident analysis to ascertain the root cause of the incident. However, in order to use data from the FDR and CVR for incident analysis, the FDR and CVR have to first be found.

In some scenarios, it may be difficult and time consuming to locate the FDR and CVR. Even when aircraft incidents occur over ground, it can take several days to locate the FDR and CVR. Moreover, after the FDR and CVR are located, incident analysis may incur a lot of time and effort, because the FDR and CVR each typically contain a large amount of information. Therefore, aircraft reports are increasingly relied upon to make up for these deficiencies.

Some current onboard systems generate aircraft reports in reliance on an internal database which includes a variety of pre-defined instructions (herein, the instructions may also be referred to as logic) that are created to assist in incident analysis. The pre-defined instructions generally poll the status of one or more aircraft subsystems or sensors. The pre-defined instructions may be created using any currently available script language, and stored in an onboard database. In such a system, typically, when one of the pre-defined instructions is met during the flight, the onboard system generates a report including essential avionics data and sends the report to a ground control station, such as an Air Traffic Control (ATC) station.

However, the aforementioned systems are primarily reactionary. An anticipatory input may improve the system. Cockpit voice (defined herein as the voice in the cockpit, the communications among flight crew, the communications between air and ground, and the aural alarms from the avionics system), may provide the valuable anticipatory input. Adding cockpit voice (for example, by scanning voice data for safety keywords) to the considerations for sending reports may cover some additional urgent scenarios that current pre-defined instructions alone cannot cover. Although keywords such "stall," "fire," "pull up", etc. are highly unlikely, a reporting system designed with an abundance of caution may look for these words in cockpit voice data in order to provide anticipatory input to the system. An onboard system capable of detecting a situation of concern earlier could trigger the sending of a report including essential aircraft parameters to the ground earlier, which may enable prevention, or timelier and more accurate incident analysis. However, it is essential to validate that any keywords captured from cockpit voice really mean something of concern is happening on the aircraft before triggering a report, or false alarms may occur.

Accordingly, an onboard reporting system capable of detecting keywords in voice data and considering the keywords in combination with respective predefined instructions is desirable. The desired system uses, for each keyword, predefined instructions to validate the keyword prior to sending a report to a ground station. The desired onboard system would improve the timeliness, accuracy and availability of the reports, as well as improving overall aircraft safety.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A method, executable by a processor, for sending a report is provided. The method comprises: receiving audio data from an audio input device; converting the audio data into voice data; obtaining keyword data from a database, wherein the keyword data comprises a plurality of keywords, each of the plurality of keywords associated with respective instructions to validate the keyword; processing the voice data and the keyword data to detect a first keyword in the voice data; when the first keyword is detected, performing the steps of (i) executing the associated instructions to determine whether the first keyword is validated, and (ii) sending the report when the first keyword is validated.

A system for sending a report from an aircraft to a ground station, the aircraft comprising an audio input device configured to provide audio data, is provided. The system comprises: a database of keyword data, wherein the keyword data comprises a first keyword and associated instructions to validate the first keyword; and a processor comprising a speech recognition product, coupled to the audio input device, and the database, the processor configured to (i) receive audio data, (ii) convert audio data into voice data, (iii) obtain keyword data, (iv) detect the first keyword in the voice data, and, in response to detecting the first keyword, (a) execute the associated instructions to determine whether the first keyword is validated, and (b) send the report to the ground station when the first keyword is validated.

Another method, executable by a processor, for sending a report from an aircraft to a ground station, is provided. The method comprises: receiving voice data from a speech recognition product; obtaining avionics data from an onboard sensor or aircraft subsystem; obtaining keyword data from a database, wherein the keyword data comprise a first keyword and associated instructions to validate the first keyword; processing the voice data and the keyword data to detect the first keyword in the voice data; when the first keyword is detected, performing the steps of (i) processing the avionics data in accordance with the associated instructions to determine whether the first keyword is validated, and (ii) sending the report when the first keyword is validated.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
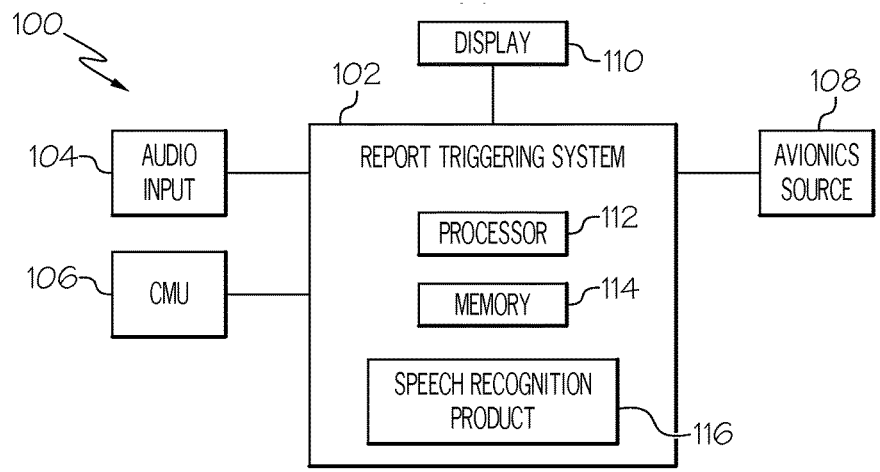
FIG. 1 is a simplified block diagram of a report triggering system, according to an exemplary embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Operations, tasks, and functions are sometimes referred to as being a set of "instructions;" such instructions may be stored in memory or a database and then computer-executed, computerized, software-implemented, or computer-implemented. The instructions may also be converted into hardware using logic gates and/or a field programmable gate array (FPGA).

In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

While not the subject of this invention, it is readily appreciated that the aircraft report ("report") will include the keyword itself and the relevant avionics data, such as aircraft parameters, and the status of aircraft sensors and subsystems. As a result, the exemplary embodiment saves the effort and cost of locating and analyzing the data within FDR and CVR, and enables timelier and more accurate incident analysis.

FIG. 1 is a simplified block diagram of report triggering system 102, according to the embodiment. Communications management unit (CMU) 106, audio input 104, cockpit display 110, and avionics sources 108 are each coupled to report triggering system 102. The report triggering system 102 may reside within or be coupled to an onboard maintenance system.

The report triggering system 102 comprises a processor 112, memory 114, and speech recognition product 116. A variety of currently available speech recognition products 116 may be used to receive audio input 104 from the cockpit, and parse it into words, typically as a text steam (the text stream is referred to herein as "voice data"). In an embodiment, the speech recognition product 116 may reside external to the report triggering system 102 and supply the voice data to the report triggering system 102. In another embodiment, the speech recognition product 116 may reside within the report triggering system 102, sharing processor 112 operations and memory 114. Regardless of the location of the speech recognition product 116, it provides a text stream of words (the voice data) to the report triggering system 102 for comparison to stored keywords.

In practice, processor 112 may comprise, or be associated with, any suitable number of individual microprocessors, flight control computers, navigational equipment, memories (such as memory 114), power supplies, storage devices, interface cards, and other standard components known in the art. In this respect, the processor 112 may include or cooperate with any number of software models, software programs (e.g., aircraft display programs) or instructions designed to carry out the various methods, process tasks, calculations, and control/display functions described below. As mentioned, processor 112 may be included within an onboard maintenance system, or may reside separately.

Memory 114 stores keywords and associated instructions for confirming the validity of the respective keyword. For each keyword, the associated instructions are customized to validate that the keyword is actually happening, and is not just a fragment of random conversation among the crew. Advantageously, the exemplary embodiment ensures that if a concerning keyword is detected, and the associated instructions are met, the onboard system is triggered to generate a report and send it to the ground station, generally via Datalink.

The embodiments presented herein associate one or more keywords with respective customized instructions for validating the keyword. For each keyword, the associated instructions are customized, such that when the instructions are "met," they validate the keyword. For example, if the keyword is "stall," the customized instructions poll avionics data, such as the status of relevant aircraft sensors and aircraft subsystems. When the associated instructions are met, it is validated that a stall is indeed underway. Accordingly, the relationship between each keyword and its associated customized instructions is unique, and storage of the keyword plus its associated customized instructions may be referred to as, for example, a data structure or a lookup table.

CMU 106 may be any suitable device for transmitting an aircraft report to a ground station. In an embodiment, the CMU 106 transmits each report via Datalink. The CMU 106 also receives and processes air traffic controller (ATC) commands for use in the report triggering system 102.

Image-generating devices suitable for use as cockpit display 110 typically take the form of a primary flight display (PFD) and a multi-function display (MFD), and include various analog (e.g., cathode ray tube) and digital (e.g., liquid crystal, active matrix, plasma, etc.) display devices. In certain embodiments, cockpit display 110 may assume the form of a Head-Down Display (HDD) or a Head-Up Display (HUD) included within a rotorcraft's Electronic Flight Instrument System (EFIS).

During operation of the report triggering system 102, the display 110 renders a displayed image that provides navigational, terrain, and weather information, as in traditional aircraft displays. Additionally, the processor 112 may generate message data and may command the display 110 to overlay the traditional displayed image with message data associated with the report triggering system 102, or with message data indicative of a status of a progress of generating and/or sending a report by the report triggering system 102. The processor processes said messages and determines, based on a respective keyword, whether to display a message and/or a status of a report. For example, caution may dictate that the system not display messages associated with keywords associated with certain incidents, such as "hijack,".

Figure 2:
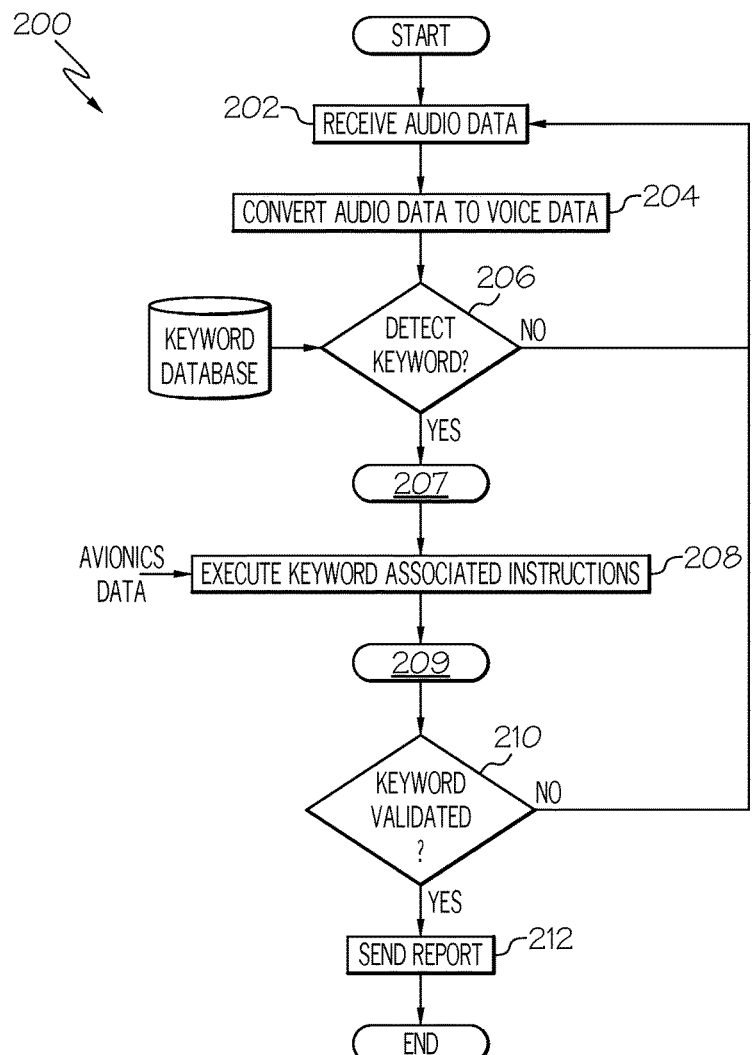
FIG. 2 is a flow diagram of an exemplary report triggering process suitable for use with the system of FIG. 1 in accordance with one or more embodiments.

FIG. 2 is a flow diagram of an exemplary report triggering process 200 suitable for use with the system of FIG. 1 in accordance with one or more embodiments. In the embodiment, the processor 112 receives audio data at STEP 202. Audio data is converted to voice data at STEP 204. In other embodiments, the processor 112 may receive voice data from an externally located speech recognition product 116. The processor obtains keyword data from a database (in the embodiment, the keyword database resides in memory 114). The audio data and keyword data are continually processed by the report triggering system 102 to detect a first keyword among words in the voice data. At STEP 206, a first keyword is detected among the various words in the voice data.

When a first keyword is detected (STEP 206) in the voice data, the processor 112 retrieves the respective associated instructions from memory 114 (i.e., the instructions associated with the first keyword), and executes the associated instructions (STEP 208). Executing the associated instructions comprises processing the avionics data that is continually received from avionics source 108 (for example, an onboard sensor or aircraft subsystem) in accordance with the associated instructions to determine the validity of the first keyword. More detail for the step of executing the associated instructions (STEP 207 to STEP 209) is provided in FIG. 3.

The first keyword is validated at STEP 210. Validating the first keyword advantageously protects against false alarms that may occur in reporting systems that trigger a report in response to voice data alone. At STEP 212, an aircraft report is generated and sent. In some embodiments, message data associated with a validated keyword is also generated and displayed on display 110. In an embodiment, the aircraft report is sent to a ground station. In other embodiments, the report may be sent to other suitable destinations. According to the safety design considerations and status of a given host aircraft status, the report triggering process 200 may end, or may start over again.

Figure 3:
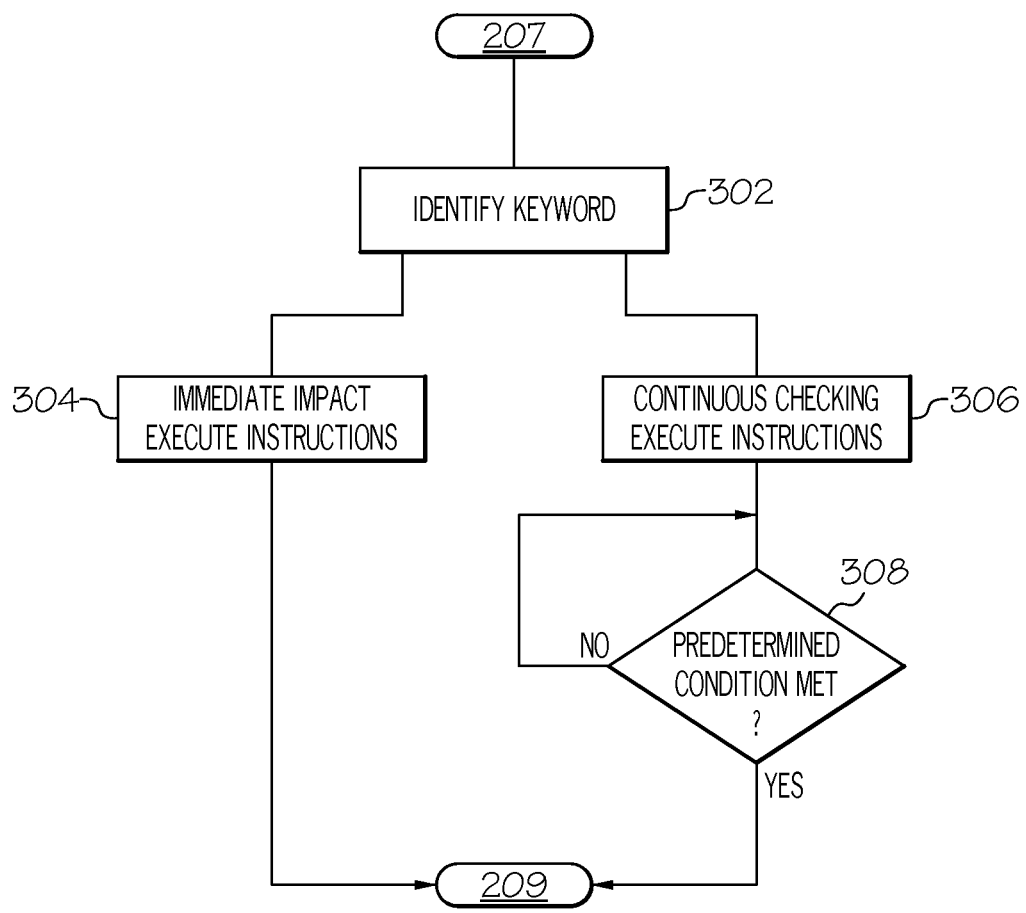
FIG. 3 is a flow diagram providing additional detail for the step of executing the associated instructions (STEP 207 to STEP 209) of the report triggering process 200.

FIG. 3 is a flow diagram providing additional detail for the step of executing the associated instructions (STEP 207 to STEP 209) of the report triggering process 200. In an embodiment, once a first keyword is detected (STEP 207), the report triggering process 200 further identifies the first keyword (STEP 302) as one of two different types: immediate impact keywords and continuous checking keywords.

An example of each type of keyword follows.

Immediate impact keywords execute the associated instructions once (STEP 304) and proceed to STEP 210 to determine whether the keyword is validated. In the embodiment, "stall" is an immediate impact keyword. For example, if the aircraft is in flight, and the pilots' statements include the word "stall", the speech recognition product 116 will present "stall" to the processor 112. The processor detects "stall" from among the voice data and retrieves the associated instructions from memory 114. In the embodiment, the associated instructions for "stall" include a variety of avionics parameter checks, such as a speed check, an angle of attack (AOA) check, and the like. The processor 112, having access to avionics data, will execute the instructions associated with "stall" to determine the validity of the "stall" keyword utterance. Only when "stall" is validated (STEP 210), the onboard system generates and sends the report (STEP 212) which includes the related parameters, such as speed, AOA, position, etc., and the "stall" keyword to the ground station. Advantageously, the ground station may immediately begin to locate the aircraft and identify the reason for the "stall."

Continuous checking keywords repeat at least some of the associated instructions (STEP 306) until a predetermined condition is met. In this manner, one or more aircraft parameters are monitored continuously until the predetermined condition occurs (STEP 308). The predetermined condition may be, for example, a passage of a predefined amount of time, a status of an aircraft sensor or subsystem, the aircraft landing, a combination of parameters, or the like. In this regard, STEP 210 may take a relatively long time to return a decision. During this time in STEP 210, the report triggering system 102 continues to receive audio data and process audio data, to detect any potentially additional keywords (as described in connection with STEP 206). In the embodiment, "hijack" is a continuous checking keyword. The processor detects "hijack" from among the voice data at STEP 206 and retrieves the associated instructions from memory 114. The processor 112, having access to avionics data, will continuously repeat at least some of the instructions associated with "hijack" until the predetermined condition is met (STEP 308) as a prerequisite to determining the validity (STEP 210) of the "hijack" keyword utterance.

Only when "hijack" is determined valid (STEP 210), the onboard system generates and sends the report (STEP 212) which includes the related parameters, and the "hijack" keyword to the ground station. In the event of a hijack, the perpetrators may not immediately change the flight path or flight plan. Therefore, in the embodiment, the instructions associated with "hijack" may cause the processor to continuously monitor aircraft parameters associated with the flight path or flight plan. A change to the flight plan may be the predetermined condition used (STEP 308) to validate the keyword "hijack" (STEP 210) and trigger the generation and sending of the hijack report (STEP2 12). Advantageously, the report triggering system is not requesting pilot or crew confirmation in this case. Therefore, the designated recipient, such as the ground station, may be timely alerted to take action accordingly, without putting aircraft crew in danger of a required user input confirmation step.

In another continuous checking example, the source of the audio input may be the cockpit aural alarm. In this example, an aircraft is flying toward a mountain and the keyword "PULL UP" from the cockpit aural alarm is detected (STEP 206) by the report triggering system 102, but the aircraft has not responded after the passage of an amount of time (the predetermined condition STEP 308). In this scenario, the report triggering system 102 may generate and send a report (STEP 212) which includes the related parameters, such as speed, position, altitude, etc., together with the "PULL UP" keyword to the ground station. In response, the ground station may immediately locate the aircraft and identify the reason for the event.

As previously stated, only when the predefined instructions are met, is the associated keyword considered validated and the respective report generated and sent to the designated recipient, such as the ground station. As previously stated, the utterance of these keywords in an aircraft cockpit is highly unlikely, the present design is intended to expand aircraft safety by including these keywords in an abundance of caution.

Thus, there has been provided an onboard reporting system capable of detecting keywords in voice data and considering the keywords in combination with respective predefined instructions. The provided system uses, for each keyword, predefined instructions to validate the keyword prior to sending a report to a ground station. The provided onboard system improves the timeliness, accuracy and availability of the reports, as well as improving overall aircraft safety.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, executable by a processor, for sending a report, the method comprising:
   receiving audio data from an audio input device;
   converting the audio data into voice data;
   obtaining keyword data from a database, wherein the keyword data comprises a plurality of keywords, each of the plurality of keywords being associated with respective instructions to validate the keyword;
   processing the voice data and the keyword data to detect a first keyword in the voice data;
   when the first keyword is detected, performing the steps of
   (i) executing the associated instructions, wherein executing the associated instructions comprises polling avionics data and relevant sensors and subsystems,
   (ii) responsive to executing the associated instructions, determining that the first keyword is validated, wherein validating the keyword is defined as determining, based on the polled avionics data, that an event corresponding to the keyword is happening at the time; and
   (iii) responsive to determining that the first keyword is validated, automatically and without user input, sending the report.

2. The method of claim 1, further comprising:
   obtaining the avionics data in accordance with the associated instructions, and the step of sending the report comprises sending the avionics data related to the keyword.

3. The method of claim 2, wherein determining whether the first keyword is validated comprises continuously repeating at least some of the associated instructions until a predetermined condition is met.

4. The method of claim 3, wherein the predetermined condition comprises a status of an avionics subsystem.

5. The method of claim 3, wherein the predetermined condition comprises a passage of an amount of time.

6. The method of claim 3, wherein the predetermined condition comprises completion of landing by the aircraft.

7. The method of claim 2, further comprising identifying the keyword as an immediate impact keyword or a continuous checking keyword.

8. The method of claim 7, wherein, when the keyword is identified as a continuous checking keyword, determining whether the keyword is validated comprises continuously repeating at least some of the associated instructions until a predetermined condition is met.

9. The method of claim 8, wherein the predetermined condition comprises a status of an avionics subsystem.

10. The method of claim 8, wherein the predetermined condition comprises a passage of an amount of time.

11. The method of claim 8, wherein the predetermined condition comprises completion of landing by the aircraft.

12. A system for sending a report from an aircraft to a ground station, the aircraft comprising an audio input device configured to provide audio data, the system comprising:
    a database of keyword data, wherein the keyword data comprises a first keyword and associated instructions to validate the first keyword; and
    a processor comprising a speech recognition product, coupled to the audio input device, and the database, the processor configured to
    (i) receive audio data,
    (ii) convert audio data into voice data,
    (iii) obtain keyword data,
    (iv) detect the first keyword in the voice data, and
    in response to detecting the first keyword, (a) execute the associated instructions wherein executing the associated instructions comprises polling avionics data and relevant sensors and subsystems,
    (b) responsive to executing the associated instructions, determine that the first keyword is validated, wherein determine that the first keyword is validated is defined as determining, based on the polled avionics data, that the an event corresponding to the keyword is happening at the time; and
    (c) responsive to determining that the first keyword is validated automatically and without user input, send the report to the ground station.

13. The system of claim 12, wherein the first keyword is one of the set comprising: hijack, stall, fire, ice, pull up, and altitude.

14. The system of claim 12,
    wherein the processor is further configured to process the avionics data in accordance with the associated instructions.

15. The system of claim 14, wherein the source of avionics data comprises an onboard sensor or an aircraft subsystem.

16. The system of claim 12, wherein the processor is further configured to identify the first keyword as an immediate impact keyword or a continuous checking keyword.

17. The system of claim 16, wherein the processor is further configured to continuously repeat at least some of the associated instructions until a predetermined condition is met to determine whether the first keyword is validated, when the first keyword is identified as a continuous checking keyword.

18. The system of claim 12, wherein the first keyword is one of a plurality of keywords and wherein the keyword database comprises each of the plurality of keywords organized such that each keyword of the plurality of keywords is associated with a respective set of instructions sufficient to validate the keyword.

* * * * *